United States Patent [19]

Cameron et al.

[11] E Re. 30,211

[45] Reissued Feb. 12, 1980

[54] PHOTOGRAPHIC ELEMENTS CONTAINING COLOR-FORMING COUPLERS HAVING AN INHIBITING EFFECT UPON THE REACTIVITY OF COMPETING COUPLERS

[75] Inventors: Robert G. Cameron, Spencerport; Dan Neuberger, Rochester, both of N.Y.

[73] Assignee: Eastman Kodak Company, Rochester, N.Y.

[21] Appl. No.: 916,172

[22] Filed: Jun. 16, 1978

Related U.S. Patent Documents

Reissue of:

[64] Patent No.: 3,933,501
Issued: Jan. 20, 1976
Appl. No.: 478,123
Filed: Jun. 10, 1974

U.S. Applications:

[63] Continuation-in-part of Ser. No. 419,573, Nov. 28, 1973, abandoned.

[51] Int. Cl.[2] ..... G03C 1/76; G03C 1/40
[52] U.S. Cl. ..... 430/503; 430/556
[58] Field of Search ..... 96/100, 55, 56.6

[56] References Cited

U.S. PATENT DOCUMENTS

| | | | |
|---|---|---|---|
| 3,265,506 | 8/1966 | Weissberger et al. | 96/100 |
| 3,408,194 | 10/1968 | Loria | 96/100 |
| 3,647,452 | 3/1972 | Hendess et al. | 96/100 |
| 3,770,446 | 11/1973 | Sato et al. | 96/100 |
| 3,816,121 | 6/1974 | Shiba et al. | 96/100 |

*Primary Examiner*—J. Travis Brown
*Attorney, Agent, or Firm*—Joshua G. Levitt

[57] ABSTRACT

Color photographic elements containing silver halide and incorporated color-forming materials are described. These elements contain at least two differentially light-sensitive emulsion layers, the overlying layer being sensitive to the relatively shorter wavelengths and containing at least one yellow dye-forming color coupler which has the unusual ability to inhibit the reaction of competing couplers (such as citrazinic acid, for example) when competing couplers are used in color developing solutions in the conventional manner. Use of these couplers in the overlying (color) layer of multilayer color photographic elements makes it possible to produce colored images having improved graininess.

Couplers having this unusual capability are selected from those having the [structures] *structure* wherein $R_1$, *and* $R_2$ [and $R_3$] are as defined herein.

25 Claims, No Drawings

PHOTOGRAPHIC ELEMENTS CONTAINING COLOR-FORMING COUPLERS HAVING AN INHIBITING EFFECT UPON THE REACTIVITY OF COMPETING COUPLERS

Matter enclosed in heavy brackets [ ] appears in the original patent but forms no part of this reissue specification; matter printed in italics indicates the additions made by reissue.

This *is an* application *for reissue of U.S. Pat.* 3,933,501, *based on U.S. Ser. No. 478,123, filed June 10, 1974, which* is a continuation-in-part of U.S. Patent application Ser. No. 419,573, filed Nov. 28, 1973 and now abandoned.

This invention relates to color photography and to novel photographic film elements. More particularly, this invention relates to multi-layer color elements containing incorporated couplers, in which one emulsion layer contains a yellow dye-forming coupler having unusual and unexpected properties.

BACKGROUND AND PROBLEMS

The use of color-forming coupler compounds which react with the development product of primary aromatic amino developing agents to form colored images upon photographic development is well known and has been the subject of many patents and other publications. The dyes formed in this way are usually insoluble in water and in the ordinary development and fixing solutions. Such coupler compounds may conventionally be added to the development solutions, or they may be incorporated into the photographic layers during the manufacture of the light sensitive elements. In this latter instance, the coupler compounds are referred to as "incorporated couplers." Incorporated couplers usually remain essentially immobile in their respective layer of the photographic element due largely to the fact that their molecules are fairly large. Immobile incorporated color-forming coupler compounds usually contain at least one so-called "ballasting" group in their molecule. Such "ballasted" photographic couplers are well known in the art and need not be dealt with in detail at this point. It should be understood that the incorporated couplers referred to herein are of the ballasted type.

Color-forming coupler compounds are generally used for subtractive color photography. Upon color development they form yellow, magenta or cyan dyes. For several important and well-known reasons, subtractive color photographic elements which are designed for realistic color rendition contain at least three distinct layers coated on a photographic support such or a transparent polymeric sheet. Generally, cyan-forming materials are placed in the color layer nearest the support, the silver halide in that layer being specially sensitized to the red region of the visible spectrum. In a color layer over the red-sensitized layer just described (possibly separated from that layer by one or more additional special purpose layers) is usually placed in magenta-forming layer, into which is incorporated magenta-forming color couplers. The silver halide in this magenta-forming layer is specially sensitized to the green region of the visible spectrum. In a third color-forming layer, which is coated over the green-sensitized layer (usually with a blue-light-absorbing layer between them) are incorporated yellow-forming coupler compounds. This yellow layer contains silver halide that is sensitive essentially to only the blue region of the visible spectrum.

Over the years, color photographic technology has been advanced and refined to the point that significant improvements are difficult to obtain. Meanwhile, consumers of color photographic products continue to demand products having better properties. Typical of the properties of concern to consumers are those directed to the clarity, sharpness and granularity of the final photographic product, i.e., the color photograph or transparency.

It is generally known that in order to decrease the granularity of the image, a large number of silver halide grains should be used (U.S. Pat. No. 2,689,793). The grains should not be reduced in size because of the need to maintain the photographic speed or sensitivity of the element. Thus, by increasing the number of silver halide grains (to improve granularity), one must increase the relative amount of silver halide in each layer. Since increases in the silver halide content of a layer generally cause concomitant increases in dye density (in each of the color layers) photographic products could result from using this approach (more silver halide) which have color densities that are too high. This, of course, would be undesirable.

One method of overcoming the problems caused by too much color density (which problems are of concern mainly in the magenta and cyan layers of the photographic element), is to use a so-called "competing coupler" during the development of the element. The competing coupler preferably forms either a colorless compound upon its reaction with oxidized color developer, or a dye which is soluble in the developer solution and can be removed by rinsing the developed element. The type and amount of competing coupler may be chosen so that the undesirable increase in color density in the magenta and cyan layers referred to above does not occur.

A complication in our problem must be considered at this point. It is apparent that in order to observe the improved granularity described above (which improvement relates almost exclusively to the appearance of the magenta and cyan layers) while at least maintaining good sharpness one should not increase the amount of silver halide in the top (yellow) color-forming layer. This is because the silver halide grains in the yellow color-forming layer deflect and/or scatter the green and red light that passes through the "yellow" dye layer to such an extent that the desired objectives (of retaining excellent clarity and sharpness and improving granularity in the magenta and cyan layers) would not result if one increases the silver halide content of the yellow dye layer to any great extent. However, by using only relatively low levels of silver halide in the yellow dye layer, the use of relatively large amounts of competing couplers (as described above) would be expected to cause an unacceptable loss of yellow color from the yellow dye layer.

It is an object of the present invention to overcome the apparent dilemma described above, so that one can obtain subtractive color photographic products which (i) exhibit the improved granularity characteristics described above (ii) have magenta and cyan dye levels which are not too high, and (iii) have yellow dye levels which are not too low. Thus, the resulting photographic color products also exhibit excellent color fidelity.

SUMMARY OF THE INVENTION

This object, and other objects which will be apparent to the reader hereof, can be attained, surprisingly, by using in the outermost color-forming emulsion layer a yellow dyeforming coupler capable of significantly inhibiting the reaction of oxidized color developing agents with competing coupler(s) in said outermost emulsion layer. Although it is not known with certainty that a true inhibition of the reactivity of competing couplers is actually taking place in the yellow-dye-forming layers of this invention (as opposed to some other form of mechanism), it is nevertheless an observed fact that competing couplers do not compete nearly as effectively in such layers as they would otherwise be expected to compete. Thus, an effective "inhibition" of their expected "competing" action is observed, and the words "inhibit," "inhibiting" and "inhibition" are used herein to describe this surprising phenomenon.

Thus, it has now been discovered that certain yellow-dye-forming couplers having [either] *the* structure [A or structure B] below, have the peculiar capability of apparently inhibiting the "competing" reaction in the layer in which such yellow-dye-forming couplers are incorporated. These couplers are those having a "Competitive Reaction Ratio" of at most about 1.20.

The couplers of the present invention having such unexpectedly low "Competitive Reaction Ratios" are so-called "pivalyl aryloxy" compounds having [either] *the* structure [A or structure B]:

[(A)]

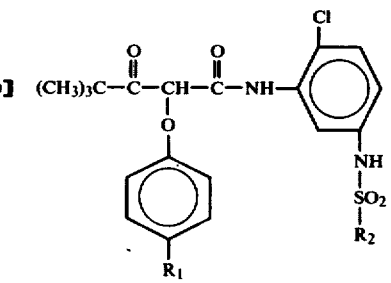

[or (B)

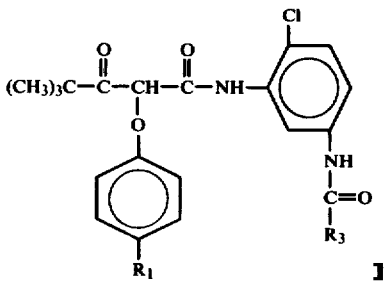

]

wherein $R_1$, *and* $R_2$ [and $R_3$] can differ and are non-interfering coupler substituent groups; at least one of $R_1$ and $R_2$ [or $R_3$ in each structure] being a ballasting group.

This invention relates to the aforementioned couplers and to multi-layer photographic elements in which the outermost layer of at least two differentially sensitized silver halide emulsion layers contains one or more of the couplers described above having "Competitive Reaction Ratios" of at most about 1.20, and preferably at most about 1.10.

The term "Competitive Reaction Ratio," as used herein, relates to the relative reactivity of a yellow dyeforming coupler in the presence of, and absence from, a competing coupler in accordance with the following formula (1):

$$\text{C.R.R.} = \frac{\text{Dmax(a)}}{\text{Dmax(p)}} \qquad (1)$$

where C.R.R. = "Competitive Reaction Ratio,"

Dmax(a) = Dmax of a yellow test strip prepared in the absence of competing coupler and Dmax(p) = Dmax of a yellow test strip prepared in the presence of a competing coupler.

The data for formula 1 is obtained using a standard test in which citrazinic acid is used as the representative competing coupler. This test is set out hereinafter in detail in the section entitled "Details Concerning The Invention".

THE PRIOR ART

Technology relating to the use of incorporated color-forming couplers in subtractive color film elements is used very extensively today, as exemplified in section XXII of the Product Licensing Index, December, 1971, page 7. Emulsions containing couplers very similar to those of the present invention are disclosed [generically] in U.S. Pat. Nos. 3,265,506; 3,384,657; 3,408,194 and 3,644,498. However, the unexpected capability illustrated by the very low "Competitive Reaction Ratios" of the coupler compounds of this invention is neither described nor suggested in these patents. Reversal processes which relate to the treatment of those layers of the present elements which contain incorporated color-forming couplers are described in detail in columns 11 and 12 of U.S. Pat. No. 2,944,900; columns 3 through 7 of U.S. Pat. No. 2,984,567; and columns 9 and 10 of U.S. Pat. No. 3,189,452. Competing colorless couplers and some of their uses are described at columns 3 through 5 and column 8 of U.S. Pat. No. 3,647,452.

The value for the term "Competitive Reaction Ratio" is obtained by performing comparative tests using the particular color-forming coupler compound in question (a) in the presence of a typical, conventional, commercially acceptable competing coupler, citrazinic acid, and (b) in the absence of the competing coupler. The test is to determine the relative amount of competition (for oxidized color developing agent) that would be expected from use of a solubilized competing coupler in a typical color developer solution when an imagewise exposed photographic element is color developed by such a solution. In the standard test detailed below, Competitive Reactive Ratios of substantially more than 1.20 are expected, and indeed are obtained in almost every instance when yellow-dye-forming couplers are tested in this way. Competitive Reaction Ratios of as much as 1.35, 1.5, 1.65 and even higher have been obtained even from tests which were performed using coupler compounds which are very similar in structure to those of the present invention. The predictability of the Competitive Reaction Ratio of a given dye-forming coupler based upon its structure alone is apparently very low, as can be appreciated from some of the data in Table I, below (following Example I). As a result of such lack of predictability based on structure, it is recommended that each new coupler compound candidate for use in the practice of this invention be subjected to the test described below prior to its actual commercial use in the manufacture of photographic elements such as those of the present invention.

The test for determining the "Competitive Reaction Ratio" is performed as follows:

1. Samples of photographic elements having the structure and composition shown in Part A, below, were exposed through a graduated-density test object and then processed by the procedure described in Part B:

| Part A | (all in mg per square decimeter) gelatin (10.7 mg) |
|---|---|
| silver halide 11.1 mgAg). 32.1 mg gelatin. $2.8 \times 10^{-8}$ moles test coupler per square decimeter dissolved in dibutyl phthalate, at a ratio of coupler/solvent of 1½ | |

| Part B | support<br>Processing (100° F./38° C.) | | |
|---|---|---|---|
| Step 1 | Black-and-white Development(1) | 4 | min. |
| Step 2 | Acid Stop | ½ | min. |
| Step 3 | Wash | 1 | min. |
| Step 4 | Color Development(2) | 8 | min. |
| Step 5 | Acid Stop | 1 | min. |
| Step 6 | Wash | 2 | min. |
| Step 7 | Bleach(3) | 1½ | min. |
| Step 8 | Fix(4) | 1½ | min. |
| Step 9 | Wash | 2 | min. |
| Step 10 | Stabilizer(5) | ½ | min. |

The maximum densities of the yellow image dyes derived from each of the evaluated couplers were measured and recorded. The pH of the color developer solution is 11.5.

| | | |
|---|---|---|
| (1) Black-and-White Developing Solution (pH 9.90) | | |
| Water | 800 | ml |
| Elon | 2 | g |
| $Na_2SO_3$ | 42 | g |
| Hydroquinone | 5.9 | g |
| $Na_2CO_3$ | 24 | g |
| NaSCN | 1.32 | g |
| NaBr | 1.5 | g |
| KI(0.1% soln.) | 9 | ml |
| Water to | 1 | liter |
| (2) Color Dev. Soln. (pH = 11.5) | | |
| $Na_2SO_3$ | 4.5 | g |
| 4-Amino-3-methyl-N-ethyl-N-β-(methanesulfonamido) ethylaniline sesqui-sulfate | 7.0 | g |
| $K_2CO_3$ (Anh) | 36 | g |
| KBr | 0.75 | g |
| KI | 0.09 | g |
| Tetramethyl ammonium hydrotriborate | 0.1 | g |
| Dithiaoctanediol (DTOD) | 1.0 | g |
| Water to | 1 | liter |
| (3) Bleach Soln. (pH 8.2) | | |
| Water | 600 | ml |
| NaBr | 35 | g |
| $Na_4Fe(CN)_6 \cdot 10H_2O$ | 240 | g |
| $K_2S_2O_2$ | 67 | g |
| NaOH | 0.10 | g |
| Borax (5 mole) | 1.0 | g |
| Carbowax 1540* | 3.0 | g |
| Water to | 1 | liter |
| *polyethoxyethanol | | |
| (4) Fix Soln. (pH 8.22) | | |
| Water | 800 | ml |
| $Na_2S_2O_3 \cdot 5H_2O$ | 180 | g |
| $Na_2SO_3$ | 9 | g |
| Water to | 1 | liter |
| (5) Stabilizer Soln. | | |
| Formalin (37.5%) | 10 | ml |
| Water to | 1 | liter |

Comparisons were made using a "control" color developer solution containing no citrazinic acid (CZA) and a CZA color developer solution containing 1.25 grams (about 0.05 moles) CZA per liter of solution. The resulting maximum yellow dye maximums were then compared:

$$\frac{D}{D_{cza}}$$

wherein D is Dmax in the absence of CZA, and Dcza is Dmax in the presence of CZA. "Comparative Reaction Ratio" is the numerical result when D is divided by Dcza. Relatively larger figures are expected, whereas relatively lower figures approaching 1.0 indicate ineffectiveness of CZA competing coupler toward the particular incorporated coupler being tested. Although the competing coupler used in this test was citrazinic acid, which is widely used commercially, it is expected that other competing couplers would perform in the practice of this invention in a manner generally similar to that of citrazinic acid. For example, "H-acid" (1-amino-8-naphthol-3,6-disulfonic acid) has been tested against several of the couplers in Table I, below (see Example I) with similar results, taking into account the general higher reactivity of H-acid as compared with citrazinic acid.

Preferred color couplers for the practice of the present invention include those having structure A:

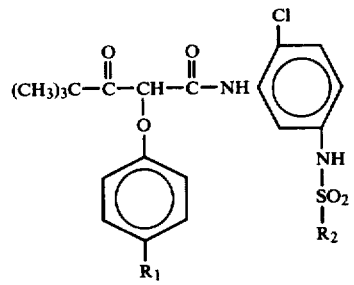

(A)

wherein $R_1$ and $R_2$ differ and are non-interfering coupler substituent groups; at least one of $R_1$ and $R_2$ being a ballasting group containing at least about 12 carbon atoms, preferably from 12 to 35 carbon atoms. Still further preferred are those compounds having the structure A, above, wherein $R_1$ is (a) -carbonyl or salt thereof, (b) -nitro, (c) 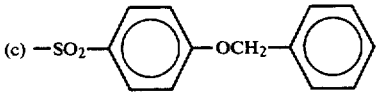

(d) 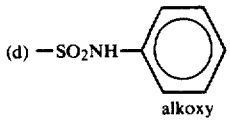

(e) —$NHSO_2$-alkyl,

-continued (f) 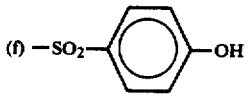

(g) 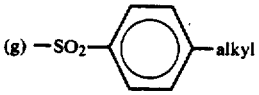

(h) 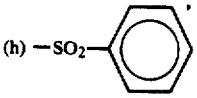

(i) $-SO_2$-alkyl or
(j) $-CN$.

and $R_2$ is
(a) $-C_nH_{2n-1}$, where n is 1 to 30
(b) -alkaryl
(c) -aralkyl
(d) -phenyl, or
(e) -alkoxyphenyl.

wherein the "alkyl" and "alkoxyl" groups contain 1–30 carbon atoms and the [alkoxy] *alkaryl*, aralkyl and alkoxyphenyl groups contain 7–35 carbon atoms.

The use of color-forming coupler compounds having Competitive Reaction Ratios of at most about 1.1 constitute a still further preferred embodiment of this invention. Such materials constitute those having structure A; wherein $R_1$ is
(a) COOH or a salt thereof (b) 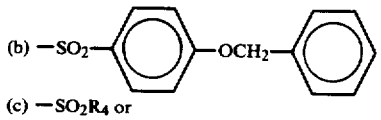

(c) $-SO_2R_4$ or (d) 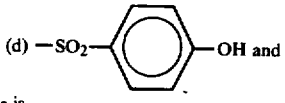 and $R_2$ is (a) 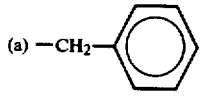

(b) 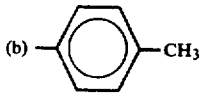

(c) $-R_5$, or (d) 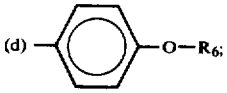

$R_4$ and $R_6$ being alkyl groups containing 1–30 (preferably 4–16) carbon atoms and $R_5$ being an alkyl group containing 1–30 (preferably 4–20) carbon atoms. Examples of such particularly preferred embodiments of this invention include the following coupler materials and photographic emulsions and photographic elements containing them, as set out herein:

1. α-Pivalyl-α-[4-(4-benzyloxybenzenesulfonyl)phenoxy]-2-chloro-(5-benzylsulfonamido)acetanilide
2. α-Pivalyl-α-[4-(4-benzyloxybenzenesulfonyl)-phenoxy]-2-chloro-5-(4-methylbenzenesulfonamido)acetanilide
3. α-Pivalyl-α-[4-(4-benzyloxybenzenesulfonyl)-phenoxy]-2-chloro-5-[n-butanesulfonamido]acetanilide
4. α-Pivalyl-α-[4-(4-benzyloxybenzenesulfonyl)-phenoxy]-2-chloro-5-(n-octanesulfonamido)acetanilide
5. α-Pivalyl-α[4-(4-benzyloxybenzenesulfonyl)-phenoxy]-2-chloro-5-(4-n-butoxybenzenesulfonamido)acetanilide
6. α-Pivalyl-α-(4-benzenesulfonylphenoxy)-2-chloro-5-n-hexadecanesulfonamido)acetanilide
7. α-Pivalyl-α-(4-methanesulfonylphenoxy)-2-chloro-5(n-hexadecanesulfonamido)acetanilide
8. α-Pivalyl-α-(4-n-dodecanesulfonamidophenoxy)-2-chloro-5-(n-dodecanesulfonamido)acetanilide
9. α-Pivalyl-α-[4-(2-n-tetradecoxybenzenesulfonamido)phenoxy]-2-chloro-5-(benzenesulfonamido)acetanilide
10. α-Pivalyl-α-(4-nitrophenoxy)-2-chloro-5-(n-hexadecanesulfonamido)acetanilide
11. α-Pivalyl-α-(4-cyanophenoxy)-2-chloro-5-n-hexadecanesulfonamido)acetanilide
12. α-Pivalyl-α-[4-(p-hydroxybenzenesulfonamido)-phenoxy]-2-chloro-5-(n-hexadecanesulfonamido)acetanilide
13. α-Pivalyl-α-[4-(n-hexadecanesulfonamido)-phenoxy]-2-chloro-5-(n-butanesulfonamido)acetanilide
14. α-Pivalyl-α-[4-benzyloxybenzenesulfonyl)-phenoxy]-2-chloro-5-(n-dodecanesulfonamido)acetanilide
15. α-Pivalyl-α-(p-carboxyphenoxy)-2-chloro-5-(n-dodecanesulfonamido)acetanilide
16. α-Pivalyl-α-[4-(4-benzyloxybenzenesulfonyl)-phenoxy]-2-chloro-5-(n-hexadecanesulfonamido)acetanilide
17. α-Pivalyl-α-(p-carboxyphenoxy)-2-chloro-5-(n-hexadecanesulfonamido)acetanilide
[18. α-Pivalyl-α-(p-carboxyphenoxy)-2-chloro-5-[α-(3-n-pentadecylphenoxy)butyramido]acetanilide]
[19] *18.* α-Pivalyl-α-[4-(4-hydroxybenzenesulfonyl)phenoxy]-2-chloro-5-(n-hexadecanesulfonamido)acetanilide The present invention can be advantageously used in the form of photographic elements which contain only two differentially sensitive color-forming silver halide emuslion layers. When so used, the low C.R.R. (Competitive Reaction Ratio) couplers of this invention should appear in association with that emulsion layer or coating which overlies the other, which other layer is closest to the support. This overlying emulsion coating should also be sensitive to the relatively shorter wavelengths of light, as compared to the underlying emulsion layer. More than two differentially sensitive color-forming emulsion layers can be present in the photographic elements of this invention. Also, additional layers such as spacing layers, barrier layers, overcoat layers and the like, comprising gelatin and/or other hydrophilic colloid materials can also be present in such photographic elements.

A preferred embodiment of the photographic element aspect of this invention involves a three-color, multi-layered photographic element in which the element contains at least three differentially sensitive color-forming silver halide emulsion layers coated on a photographic support such as paper, transparent polymeric film, glass, and the like. In such elements, the color-forming silver halide emulsion layer nearest the support is sensitized to red light. Overlying the red sensitive layer is a green sensitive silver halide emulsion layer. Overlying the green sensitive layer is a blue sensitive silver halide emulsion layer. Associated with each of these respective differentially sensitive emulsion layers is at least one color-forming coupler compound, chosen to form a dye image in the appropriate emulsion layer, the color which is complimentary to the color of light to which the layer is sensitive. Other layers can also be present in such preferred 3-color elements, including a Carey Lea filter layer (of very finely divided silver) between the blue sensitive and green sensitive emulsion layers, gel overcoat and interlayers, and the like, including layers in which some or all of the gelatin is replaced with other suitable hydrophilic colloid materials.

The green-sensitized and red-sensitized silver halide emulsion layers in the photographic elements of this invention have incorporated in them magenta dye-forming color couplers and cyan dye-forming color couplers, respectively, in addition to the spectrally sensitized silver halide materials described above. Since the particular identity of the specific incorporated color-forming magenta and cyan dye-forming couplers that are selected for use in the practice of this invention does not constitute an essential element of the invention, such materials will not be discussed in detail herein. Many examples of the use of incorporated color-forming photographic couplers exist, including many of those described in Section XXII on page 110 of Product Licensing Index, December 1971.

Similarly, much has been published concerning the manufacture of multi-layer "color" photographic elements. See, for example, the several procedures referred to in Section XVIII on page 109 of Product Licensing Index, December 1971. The successful practice of the present invention does not depend upon any particular manipulative procedure being used in the manufacture of the photographic elements described above, nor in the use of any particular type of manufacturing equipment, so long as the essential features regarding constitution of the various color-forming layers, as set out hereinbefore, are observed.

Although acceptable color images can be manufactured in accordance with the "element" aspect of the present invention independent from the particular levels of silver halide that are used in the various emulsion layers of the present invention (so long as there is at least enough silver halide to form an identifiable image after processing), one preferred embodiment of the invention involves the use of relatively higher (than usual) levels of silver halide in at least one of the red- and green-sensitized layers of our elements. Thus, preferred levels of silver halide in these layers is from about 10.7 to about 21.4 mg (silver) per square decimeter of film in each of the green- and red-sensitized layers. In this preferred embodiment, the amount of silver halide in the yellow dye-producing (outermost color) layer of our element is from about 64 to about 16 mg. (silver) per square decimeter of film. Using this embodiment results in optimum sensitivity (better image effects) when such effects are desired, and relatively higher color densities in the red- and green-sensitized layers. Thus, the ratio of the weight of silver in the yellow dye-forming layer, as compared with the weight of silver in either the green or red-sensitive layer of the present elements is preferably at most about 0.67. The use of competing couplers in the color developer solutions (during the color development of the elements of this invention) is contemplated. The use of competing couplers is well known in the art and need not be described in detail herein because ordinary usage of such materials is contemplated herein, and any desired competing coupler material can be used, as desired, with the usual precautions relating to color formation, relative reactivity, and concentration of the competing couplers being kept in mind. For example, it is preferred that a competing coupler be used that forms an essentially colorless reaction product with oxidized organic amino color developer materials. Competing couplers are described in detail in U.S. Pat. Nos. 3,647,452 and 2,689,793 and many other publications.

It should be noted that the use of relatively higher levels of silver halide and competing couplers, as described immediately above, would be of little or no value in conventional color photography involving incorporated color-forming couplers because of the offsetting requirement in conventional photoelements that a higher level of silver halide be used in the blue-sensitize layer. (Otherwise, the effect of the use of competing coupler would be to significantly decrease the density of the yellow dye in the blue-sensitive layer.) As was pointed out above, the use of such higher levels of silver halide in the yellow layer is undesirable for high quality photography because higher levels of silver halide in the outer layer(s) of the film element cause decreases in the image sharpness in the green- and red-sensitized layers due to additional diffraction of the green and red light by the silver halide particles as that light passes through the outer, blue-sensitive layer. The avoidance of this problem represents one of the significant advances in the art that can result from practicing this invention.

Each of the various layers in the present photographic elements can also contain other photographic addenda as desired, including, for example, anti-foggants, stabilizers, development modifiers, anti-stain ingredients, hardeners, incorporated developing agents, surfactants, antistatic agents, brighteners, plasticizers, lubricants, matting agents and the like. Many examples of potentially useful addenda are described and referred to in the Product Licensing Index. Vol. 92, December 1971, publication 9232, pages 107–110. Examples of supports, spectral sensitizers, and silver halide emulsions useful in the practice of this invention, as well as how to make and use such materials and compositions can also be found in this Product Licensing Index article.

EXAMPLE I

In this Example, the method for testing yellow dye-forming coupler compounds to determine their Competitive Reaction Ratios described hereinbefore was used. Results of this test for many coupler compounds are set out in Table I, below. Note that in Table I, the figures in parenthesis at the right of the structural formulas are C.R.R. data resulting from these tests.

Table I
Competitive Reaction Ratios (CRR)
For Yellow Dye-Forming Couplers
| Coupler Identity | Coupler Structural Formula | (CRR) |
|---|---|---|
| A. | 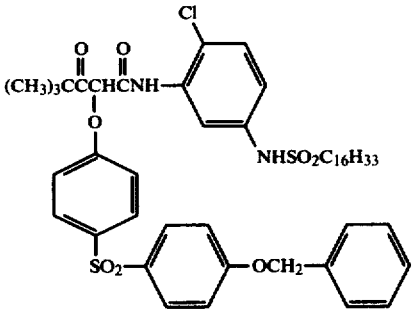 | (1.10) |
| B. | 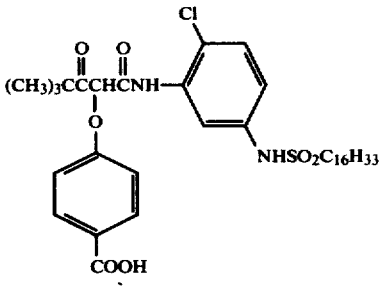 | (1.04) |
| C. | 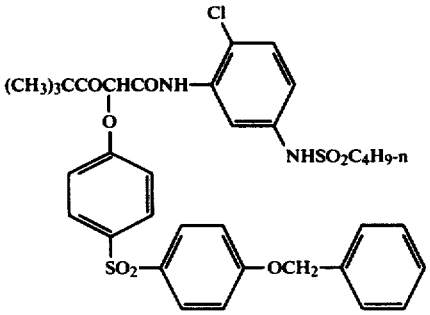 | (1.00) |
| D. | 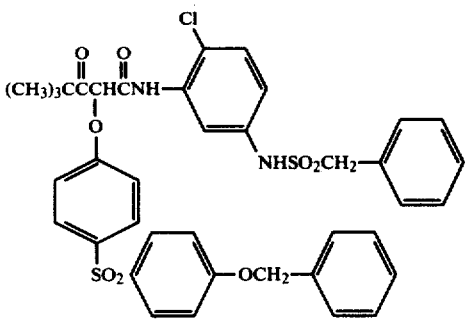 | (1.01) |

Table I-continued
Competitive Reaction Ratios (CRR)
For Yellow Dye-Forming Couplers
| Coupler Identity | Coupler Structural Formula | (CRR) |
|---|---|---|
| E. | 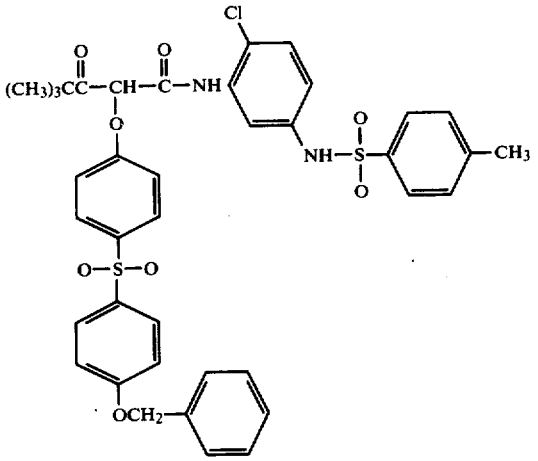 | (1.01) |
| F. | 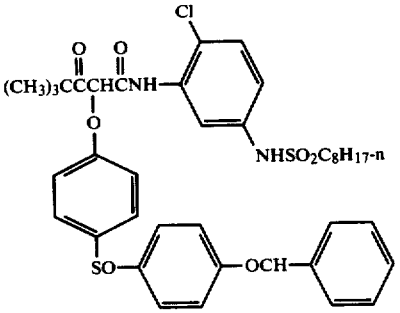 | (1.01) |
| G. | 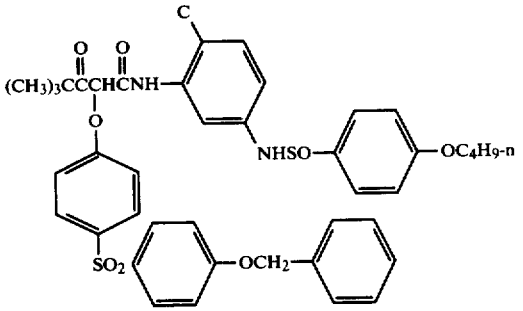 | (1.00) |
| H. | 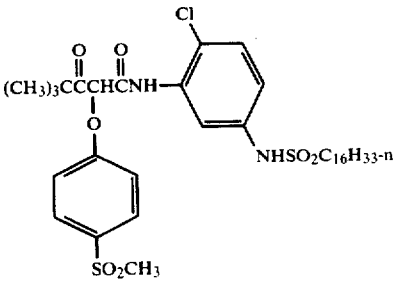 | (1.05) |

Table I-continued
Competitive Reaction Ratios (CRR)
For Yellow Dye-Forming Couplers
| Coupler Identity | Coupler Structural Formula | (CRR) |
|---|---|---|
| I. | 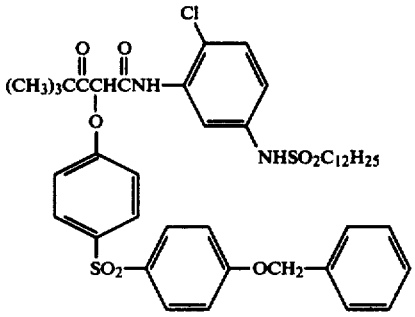 | (1.03) |
| J. | 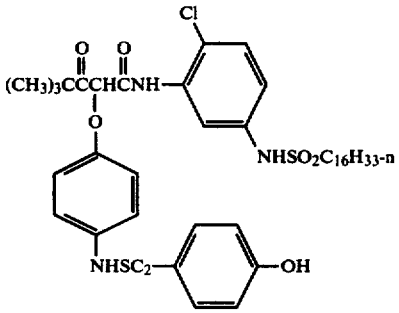 | (1.08) |
| K. | 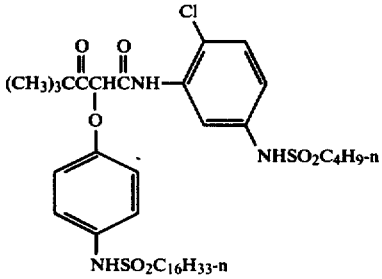 | (1.07) |
| L. | 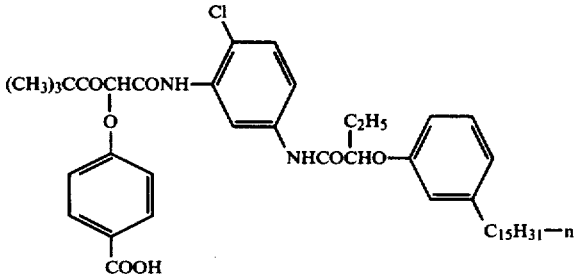 | (1.15) |
| M. | 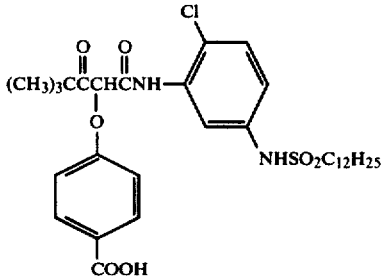 | (1.11) |

Table I-continued
Competitive Reaction Ratios (CRR)
For Yellow Dye-Forming Couplers
| Coupler Identity | Coupler Structural Formula | (CRR) |
|---|---|---|
| N. | 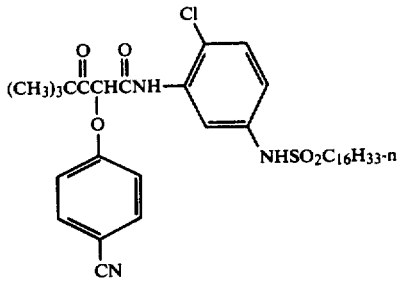 | (1.15) |
| O. | 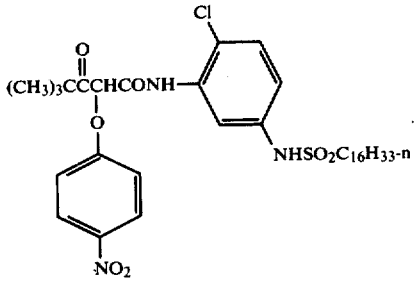 | (1.17) |
| P. | 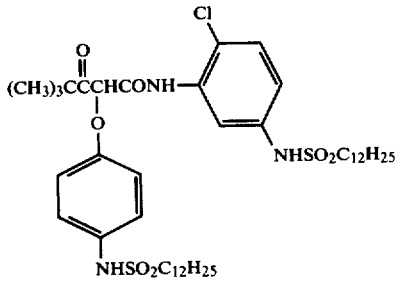 | (1.15) |
| Q. | 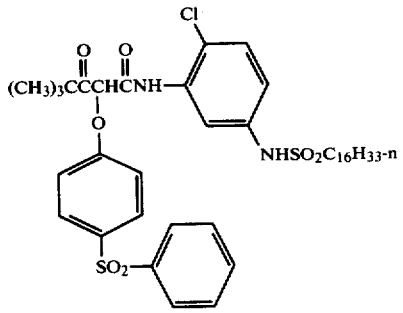 | (1.11) |
| R. | 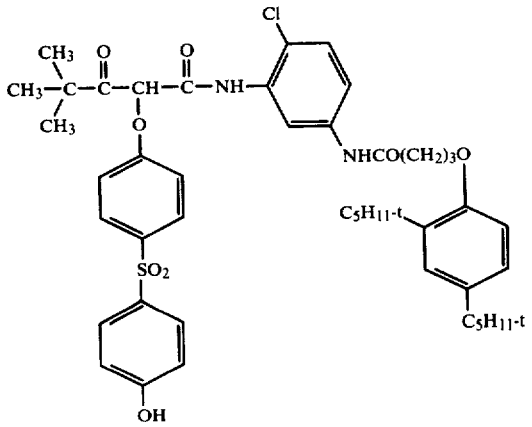 | (1.14) |

Table I-continued
Competitive Reaction Ratios (CRR)
For Yellow Dye-Forming Couplers
| Coupler Identity | Coupler Structural Formula | (CRR) |
|---|---|---|
| S. | 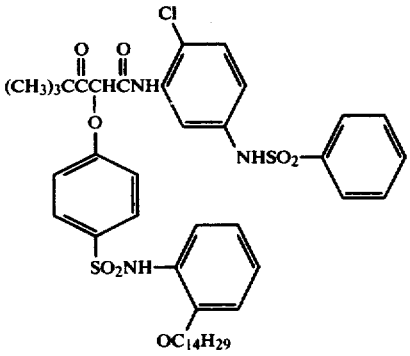 | (1.05) |
| T. | 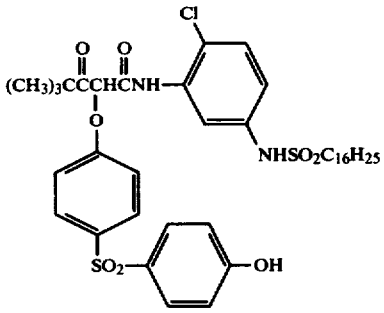 | (1.05) |
| U. | 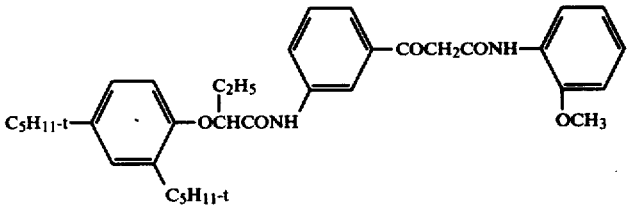 | (1.13) |
| V. | 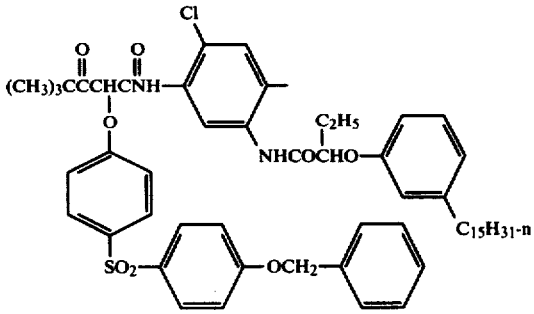 | (1.33) |
| W. | 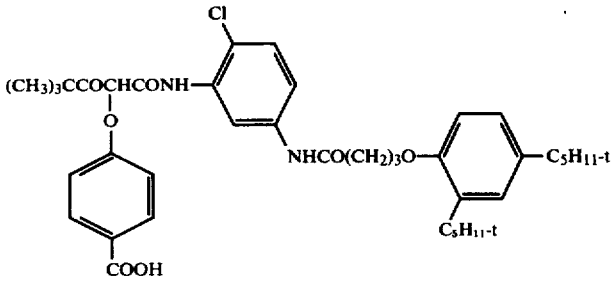 | (1.21) |

Table I-continued
Competitive Reaction Ratios (CRR)
For Yellow Dye-Forming Couplers
| Coupler Identity | Coupler Structural Formula | (CRR) |
|---|---|---|
| X. | 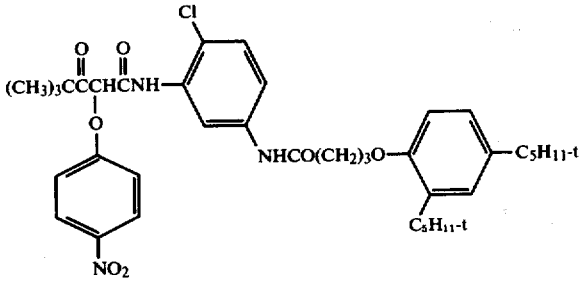 | (1.56) |
| Y. | 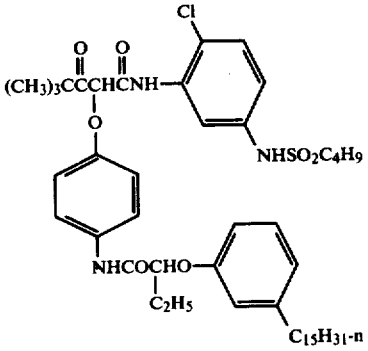 | (1.28) |
| AA. | 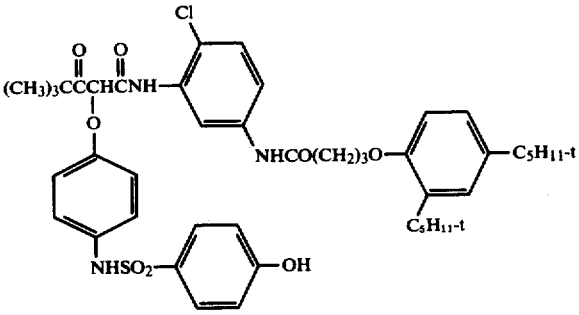 | (1.28) |
| BB. | 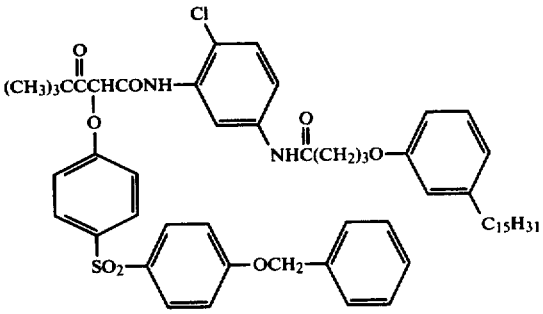 | (1.33) |
| CC. | 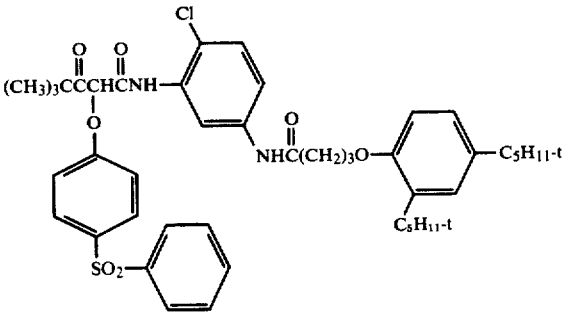 | (1.49) |

Table I-continued

Competitive Reaction Ratios (CRR) For Yellow Dye-Forming Couplers

| Coupler Identity | Coupler Structural Formula | (CRR) |
|---|---|---|
| DD. | 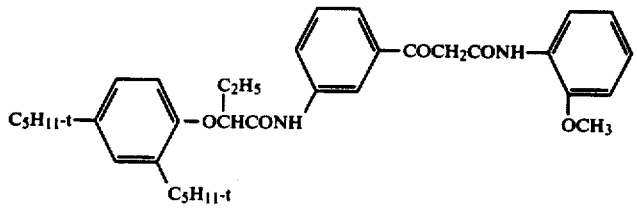 | (1.13) |
| EE. | 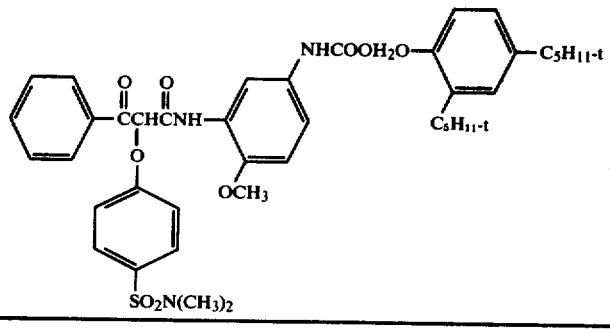 | (1.37) |

From the C.R.R. data in Table I, the surprising nature of this invention can be appreciated. Note that many compounds having chemical structures very similar to the couplers of the present invention are apparently not capable of inhibiting the action of competing couplers such as citrazinic acid either to an acceptable extent or even at all. Some of the compounds tested appear to have the reverse effect; namely, that of favoring the action of the competing coupler as compared with the more desired formation of yellow dye:

Tests almost identical to those performed to determine the "C.R.R." of the couplers of Table I, above, were, carried out using eight times the amount of competing coupler. Otherwise the tests were the same. Data resulting from this series of tests appear in Table II, below.

Table II

Effect of Use of Large Excess of Competing Coupler

| Coupler Identity[1] | $D_{max}$ 1.25 g/l CZA[2] | $D_{max}$ 10.0 g/l CZA |
|---|---|---|
| A | 2.92 | 1.80 |
| B | 2.83 | 2.42 |
| C | 3.00 | 2.80 |
| D | 2.37 | 2.37 |
| E | 2.82 | 2.82 |
| F | 3.24 | 2.51 |
| G | 3.04 | 2.61 |
| H | 2.83 | 2.42 |
| I | 2.05 | 1.06 |
| M | 3.26 | 3.07 |
| O | 2.95 | 1.74 |
| U | 3.02 | 1.73 |
| W | 3.28 | 1.86 |

[1]See Table I for structural formula
[2]Quantity used in C R R test

From Table II it can be appreciated that the color couplers of this invention are surprisingly effective even in the presence of a large excess of competing coupler, the color-forming action of some couplers apparently remaining almost unaffected by the presence of very large amounts of citrazinic acid.

The color coupler compounds of this invention can be made by well-known procedures such as those described in U.S. Pat. No. 3,265,506 and 3,408,194, for example.

The invention has been described in detail with particular reference to preferred embodiments thereof, but, it will be understood that variations and modifications can be effected within the spirit and scope of the invention.

What is claimed is:

1. In a photographic element comprising a support coated with at least two silver halide emulsion layers; each of said emulsion layers being preferentially sensitive to different regions of the visible spectrum and each of said emulsion layers being associated with at least one coupler compound which, upon reaction with oxidized primary aromatic amine color developing agent, forms an image dye; a first emulsion layer sensitive to the relatively shorter wavelength region of the visible spectrum overlying the second emulsion layer in said element, said second emulsion containing a cyan dye-forming coupler compound or a magenta dye-forming coupler compound;

the improvement which comprises, in said element, the presence in said first emulsion layer of a yellow dye-forming coupler compound having a Competitive Reaction Ratio of at most about 1.20; said yellow dye-forming coupler compound being selected from those having [one of] the structure[s]:

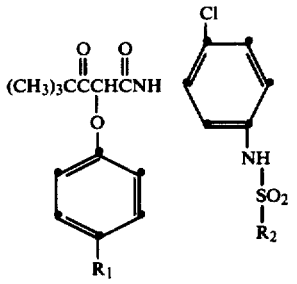

wherein $R_1$, *and* $R_2$ [and $R_3$] can differ and are non-interfering coupler substituent groups; at least one of $R_1$ and $R_2$ [in structure A and at least one of $R_1$ and $R_3$ in structure B] being a ballasting group; said $R_1$ being -nitro,

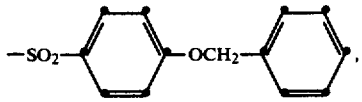

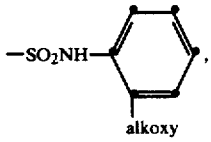

alkoxy

—$NHSO_2$-alkyl,

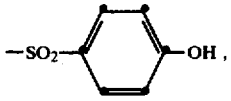

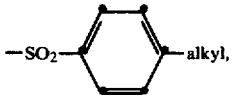

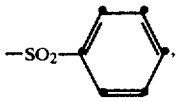

—$SO_2$-alkyl, or
—CN, and said $R_2$ being
—$C_nH_{2n+1}$, where n is 1 to 30;
-alkaryl;
-aralkyl;
-phenyl; or
alkoxyphenyl,
wherein the groups designated as alkyl and alkoxy contain 1-30 carbon atoms and the alkaryl, aralkyl and alkoxyphenyl groups contain 7-35 carbon atoms.

[2. An improved photographic element as in claim 1, wherein said yellow dye-forming coupler compound has the structure:

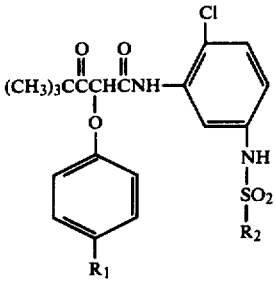

]

[3. An improved photographic element as in claim 1, wherein said yellow dye-forming coupler compound has the structure:

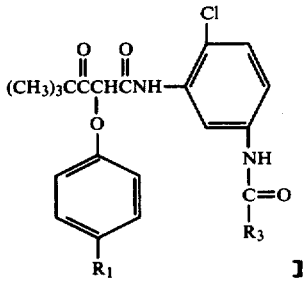

]

4. An improved photographic element as in claim [2] *1*, wherein said element contains three differentially sensitive emulsion layers and said yellow dye-forming coupler compound is in the layer farthest from the support of said three emulsion layers.

5. An improved photographic element as in claim 4, wherein $R_1$ is

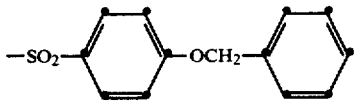

—$SO_2R_4$, or

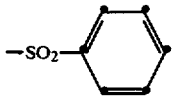

and $R_2$ is

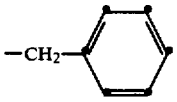

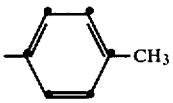

—$R_5$, or

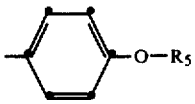

$R_4$ and $R_5$ being alkyl groups containing 1–30 carbon atoms.

6. An improved photographic element as in clain 5, wherein $R_4$ and $R_5$ are alkyl groups containing from about 4 to about 20 carbon atoms.

7. An improved photographic element as in claim 6, wherein said yellow dye-forming coupler compound is

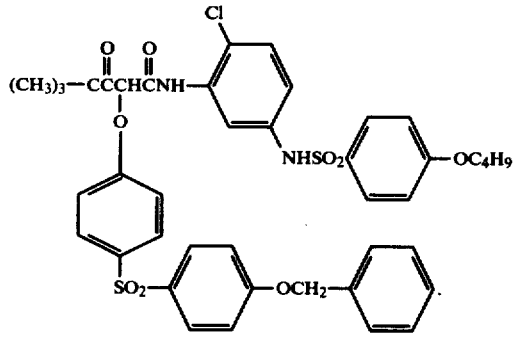

8. An improved photographic element as in claim 6, wherein said yellow dye-forming coupler compound is

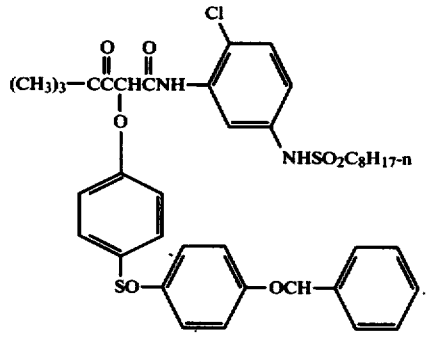

9. An improved photographic element as in claim 6, wherein said yellow dye-forming coupler compound is

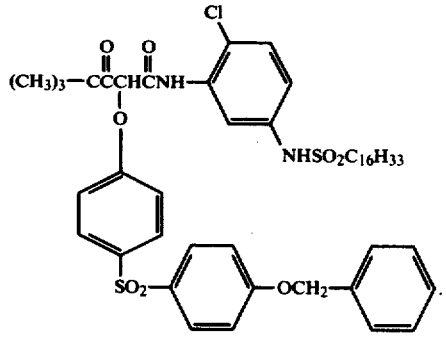

10. An improved photographic element as in claim 6, wherein said yellow dye-forming coupler compound is

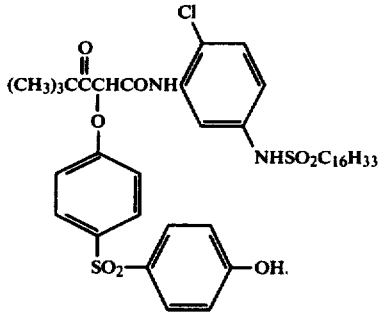

11. An improved photographic element as in claim 1, wherein the ratio of the weight of silver in said second emulsion layer to the weight of silver in said first emulsion layer is at least about 1.5.

[12. An improved photographic element as in claim 11, wherein said yellow dye-forming coupler compound has the structure:

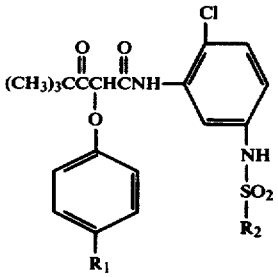

]

[13. An improved photographic element as in claim 11, wherein said yellow dye-forming coupler compound has the structure:

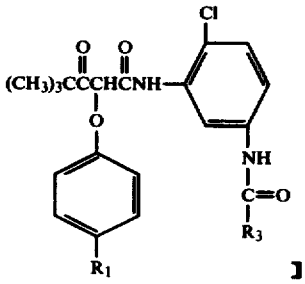

]

14. An improved photographic element as in claim 11, wherein said element contains three differentially sensitive emulsion layers and said yellow dye-forming coupler compound is in the topmost of said three emulsion layers.

15. An improved photographic element as in claim [12] *11*, wherein $R_1$ is

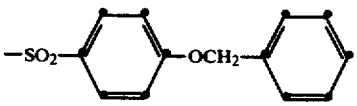

$-SO_2R_4$, or

-continued

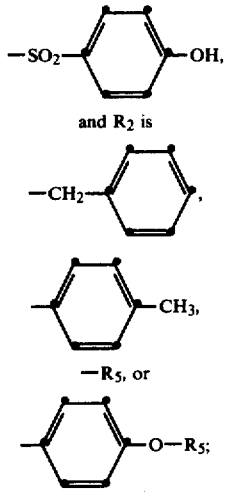

and $R_2$ is $-R_5$, or $R_4$ and $R_5$ being alkyl groups containing 1-30 carbon atoms.

16. An improved photographic element as in claim 15, wherein $R_4$ and $R_5$ are alkyl groups containing from about 4 to about 20 carbon atoms.

17. An improved photographic element as in claim 16, wherein said yellow-dye-forming coupler compound is

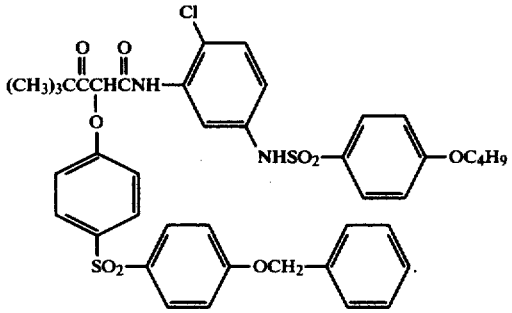

18. An improved photographic element as in claim 16, wherein said yellow-dye-forming coupler compound is

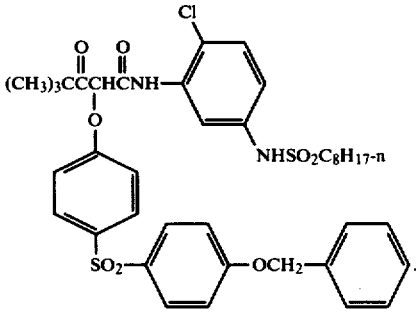

19. An improved photographic element as in claim 16, wherein said yellow-dye-forming coupler compound is

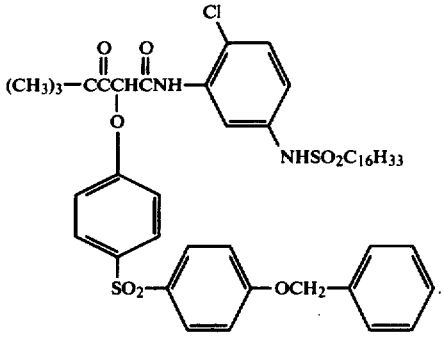

20. An improved photographic element as in claim 16, wherein said yellow-dye-forming coupler compound is

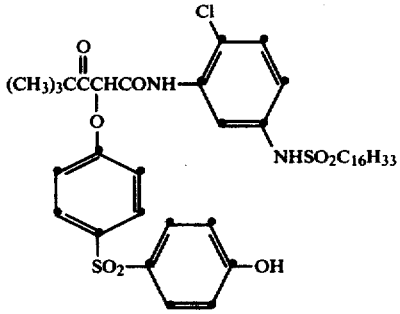

21. In a photographic element comprising a support coated with three different silver halide emulsion layers containing, incorporated in said emulsion layers, coupler compounds capable of forming dyes upon reaction with oxidized aromatic amine color developing agents; said emulsion layers consisting of a first emulsion layer overlying second and third emulsion layers; said first emulsion layer being sensitive to light in the blue region of the visible spectrum and containing an incorporated yellow dye-forming coupler compound, said second emulsion layer being spectrally sensitized to respond to light in the green region of the visible spectrum and containing an incorporated magenta dye-forming coupler compound, and said third emulsion layer being spectrally sensitized to respond to light in the red region of the visible spectrum and containing an incorporated cyan dye-forming coupler compound;

the improvement which comprises

A. the ratio of the weight of silver in said second emulsion layer to the weight of silver in said first emulsion layer being at least about 1.5;

b. the presence in said first emulsion layer of a yellow dye-forming coupler compound having a Competitive Reaction Ratio of at most about 1.20; and c. said yellow dye-forming coupler compound having [one of] the structure[s]:

[(A) ]

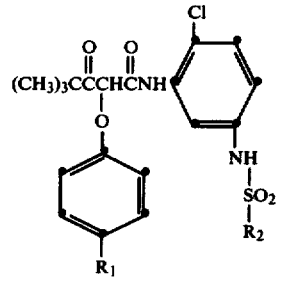

[or (b)

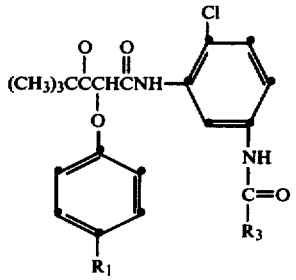

]

wherein $R_1$ *and* $R_2$ [and $R_3$] can differ and are non-interferring coupler substituent groups, at least one of $R_1$ and $R_2$ [in structure A and at least one of $R_1$ and $R_3$ in structure B] being a ballasting group;
said $R_1$ being—nitro,

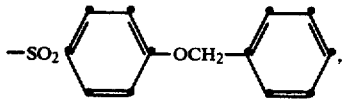

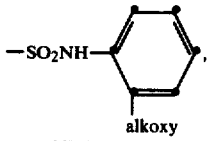

alkoxy
—$NHSO_2$—alkyl,

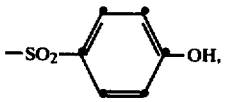

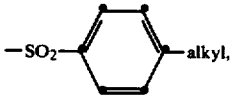

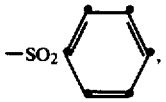

—$SO_2$-alkyl, or —CN, and said $R_2$ being
—$C_nH_{2n+1}$, where n is 1 to 30;
-alkaryl;
-aralkyl;
-phenyl; or
-alkoxyphenyl,
wherein the groups designated as alkyl and alkoxy contain 1-30 carbon atoms and the alkaryl, aralkyl and alkoxyphenyl groups contain 7-35 carbon atoms.

[22. An improved photographic element as in claim 21, wherein said yellow dye-forming coupler compound has the structure:

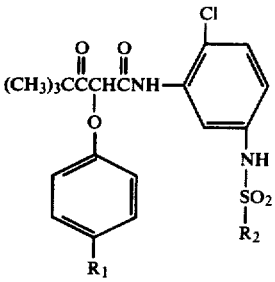

]

[23. An improved photographic element as in claim 21, wherein said yellow dye-forming coupler compound has the structure:

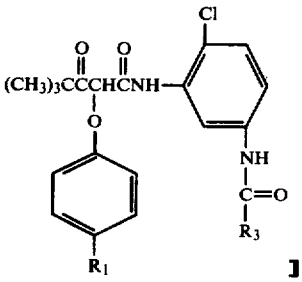

]

24. An improved photographic element as in claim 21, wherein
$R_1$ is

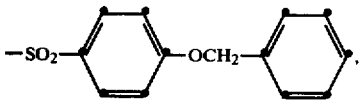

—$SO_2R_4$, or

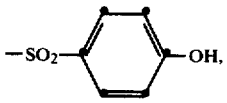

and $R_2$ is

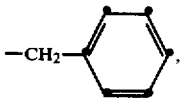

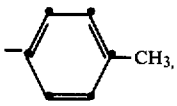

—$R_5$, or

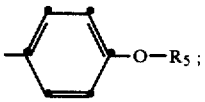

$R_4$ and $R_5$ being alkyl groups containing 1-30 carbon atoms.

25. An improved photographic element as in claim 24, wherein $R_4$ and $R_5$ are alkyl groups containing from about 4 to about 20 carbon atoms.

26. An improved photographic element as in claim 25, wherein said yellow dye-forming coupler compound is

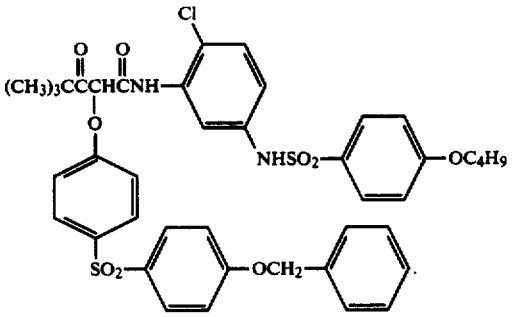

27. An improved photographic element as in claim 25 wherein said yellow-dye-forming coupler compound is

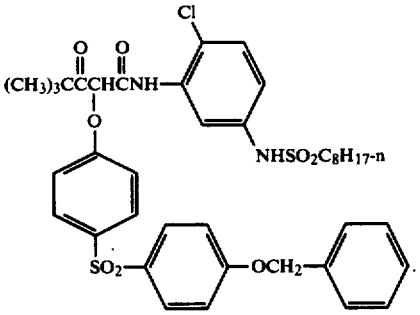

28. An improved photographic element as in claim 25, wherein said yellow-dye-forming coupler compound is

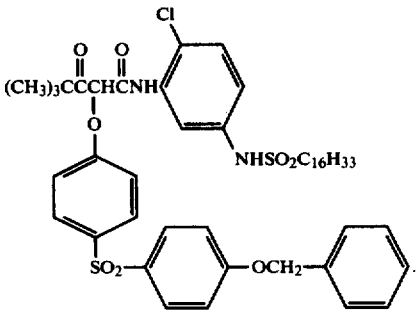

29. An improved photographic element as in claim 25, wherein said yellow-dye-forming coupler compound is

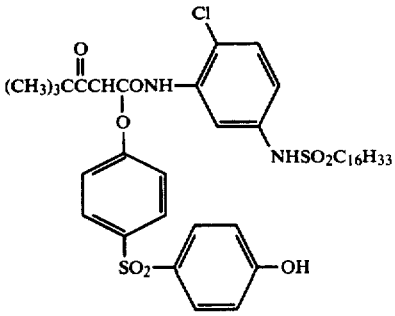

*30. In a photographic element comprising a support coated with at least two silver halide emulsion layers; each of said emulsion layers being preferentially sensitive to different regions of the visible spectrum and each of said emulsion layers being associated with at least one coupler compound which, upon reaction with oxidized primary aromatic amine color developing agent, forms an image dye; a first emulsion layer sensitive to the relatively shorter wavelength region of the visible spectrum overlying the second emulsion layer in said element; said second emulsion containing a cyan dye-forming coupler compound or a magenta dye-forming coupler compound; the improvement which comprises, in said element, the presence in said first emulsion layer of a yellow dye-forming coupler compound having a Competitive Reaction Ratio of at most about 1.20; said yellow dye-forming coupler compound having the structure:*

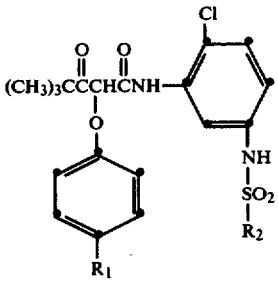

*wherein $R_1$ and $R_2$ can differ and are non-interfering coupler substituent groups; at least one of $R_1$ and $R_2$ being a ballasting group; said $R_1$ being*

*—nitro,*

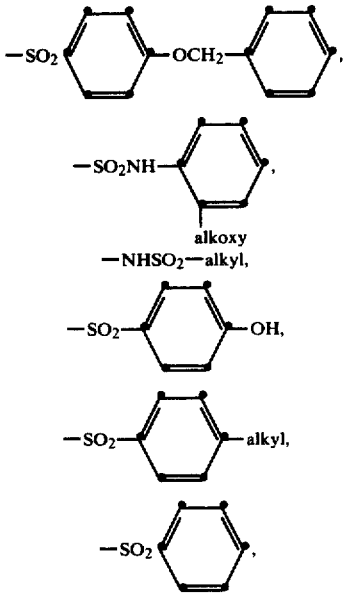

*—$SO_2$-alkyl, or*

*—CN, and*

*said $R_2$ being*

*—alkaryl,*

*—aralkyl,*

*—phenyl, or*

*—alkoxyphenyl,*

*wherein the groups designated as alkyl and alkoxy contain 1–30 carbon atoms and the alkaryl, aralkyl and alkoxyphenyl groups contain 7–35 carbon atoms.*

*31. In a photographic element comprising a support coated with at least two silver halide emulsion layers; each of said emulsion layers being preferentially sensitive to different regions of the visible spectrum and each of said emulsion layers being associated with at least one coupler compound which, upon reaction with oxidized primary aromatic amine color developing agent, forms an image dye; a first emulsion layer sensitive to the relatively shorter wavelength region of the visible spectrum overlying the second emulsion layer in said element; said second emulsion containing a cyan dye-forming coupler compound or a magenta dye-forming coupler compound; the improvement which comprises, in said element, the presence in said first emulsion layer of a yellow dye-forming coupler compound having a Competitive Reaction Ratio of at most about 1.20; said yellow dye-forming coupler compound having the structure:*

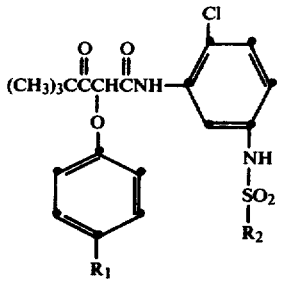

*wherein $R_1$ and $R_2$ can differ and are non-interfering coupler substituent groups; at least one of $R_1$ and $R_2$ being a ballasting group; said $R_1$ being*

*—$SO_2$—alkyl,*

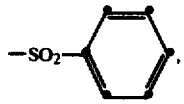

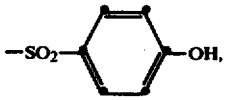

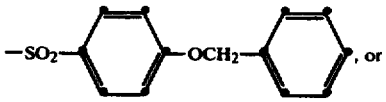

*—$NHSO_2$—alkyl*

*wherein the groups designated as alkyl contain 1–30 carbon atoms; and*

*$R_2$ being an alkyl group containing 4–20 carbon atoms.*

* * * * *